O. ROBERTS.
FRUIT STAND.
APPLICATION FILED MAY 12, 1913.
1,105,376.
Patented July 28, 1914.
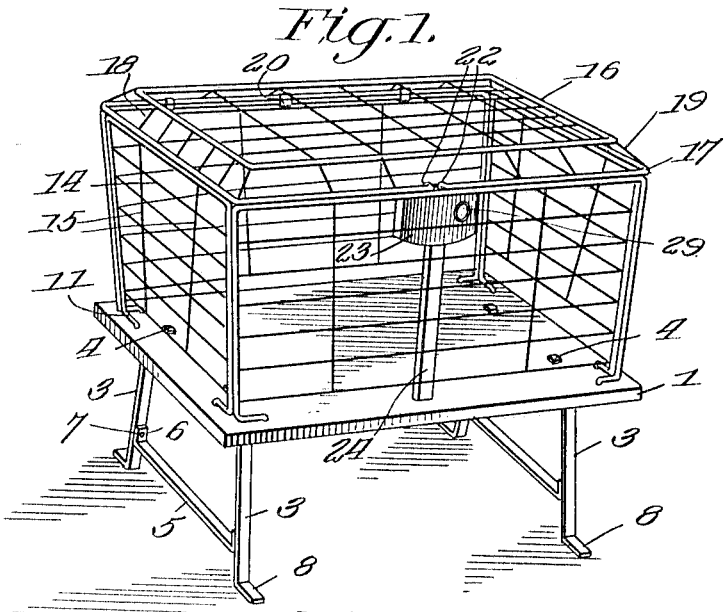
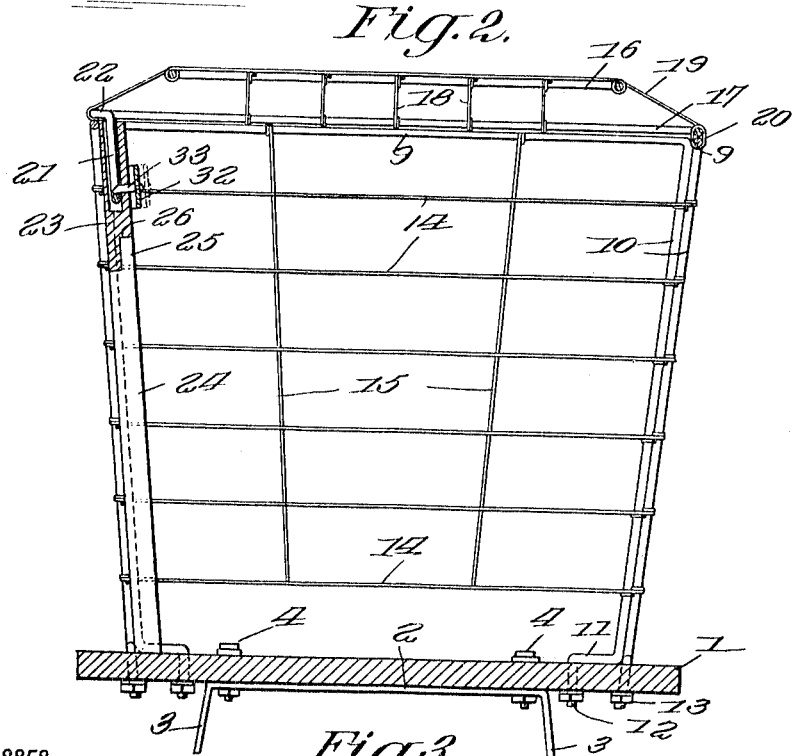
WITNESSES
S. E. Wade
C. E. Trainer
INVENTOR
Odineal Roberts
BY Munn & Co.
ATTORNEYS

UNITED STATES PATENT OFFICE.

ODINEAL ROBERTS, OF BONHAM, TEXAS.

FRUIT-STAND.

1,105,376.

Specification of Letters Patent.

Patented July 28, 1914.

Application filed May 12, 1913. Serial No. 766,983.

*To all whom it may concern:*

Be it known that I, ODINEAL ROBERTS, a citizen of the United States, and a resident of Bonham, in the county of Fannin and State of Texas, have invented a new and useful Improvement in Fruit-Stands, of which the following is a specification.

My invention is an improvement in fruit stands, and has for its object to provide a stand of the character specified, in the form of a receptacle for holding fruit, so arranged that while the fruit may be freely inspected it cannot be removed from the receptacle without opening the same.

In the drawings:—Figure 1 is a perspective view from the front of the improved stand, Fig. 2 is a transverse vertical section, and Fig. 3 is a longitudinal section through the lock.

The present embodiment of the invention comprises a base 1 of wood or like suitable material, having at each end a transversely arranged supporting bracket, the said bracket being formed in the present instance by bending a bar of metal or the like to form a portion 2, lying transverse to the base on the under face thereof, and having at each end an angular portion 3, the said portion forming supporting legs for supporting the base. The portion 2 of each bracket is secured to the base by bolts and nuts 4, and the supporting legs 3 are connected near their lower ends by means of a cross bar 5, the said bar having at each end an angular lug 6, lapping on the inner face of the adjacent leg and secured thereto by means of a rivet 7, or the like. The lower end of each of the portions or supporting legs 3 are bent laterally outward as shown at 8, for engaging the surface upon which the stand is to be supported.

The receptacle is formed by a plurality of substantially U-shaped frames, each frame comprising a horizontal body portion 9, and depending arms 10. Each of the said arms 10, is provided at its lower end with an angular portion 11, each of the said portions being bent inwardly approximately parallel with the body 9 of the frame, and each of the said angular portions 11 is provided with a lug 12, extending at approximately a right angle to the portion 11, and having its free end threaded.

The base 1 is provided with openings for receiving the lugs 12, and each lug is engaged by a nut 13, below the base. The portion 11 of each of the arms 10 rests upon the upper face of the base, and the arms 10 on each frame converge slightly toward the base. The arms 10 of each frame are connected by spaced horizontal wires 14, and the body 9 of each frame is connected to the lowermost wire 14, by vertical wires 15, the said wires 15 crossing the wires 14.

The frames forming the sides of the receptacle differ from the frames forming the ends thereof, in that the bodies 9 thereof are of greater length than the bodies 9 of the end frames, so that an oblong receptacle is formed. On account of the convergence of the arms 10 of each frame, the receptacle, as a whole, is of greater cross section at the top than at the bottom.

A cover is provided, the said cover consisting of upper and lower substantially rectangular frames 16 and 17, the frame 17 being of greater length and width than the frame 16. The frame 17 is of such size that the side and end members thereof will rest upon the bodies 9 of the side and end frames of the receptacle, while the frame 16 is of smaller size than the frame 17, and is arranged above the same, yet with its center in vertical alinement with the center of the frame 17.

The end members of the frames 16 and 17 are connected by wires 18, and the side members of the frames 16 and 17 are connected by wires 19, the said wires being connected with the side members of the frame 17, and then passing upward to the side members of the frame 16, upon which the said wires are wound a single turn. Each of the wires 19 extends across the frame 16, the said wires having their ends connected with the side members of the frame 17. The wires 18 cross the frame 16.

One of the side members of the frame 17 is hinged to the body of one of the side frames, by means of loops 20 of metal or the like, the said loops being arranged at spaced intervals as shown in Fig. 1. The side and end frames of the receptacle proper, and the frames 16 and 17 are formed of heavy wire of suitable cross section, while the wires 14—15—18—19 are of smaller size.

The frame 17 is composed of a single wire bent to proper form and at the center of the side member remote from the hinges 20, a downwardly extending loop 21, is formed, the said loop being offset inwardly from the side member and connected thereto by integral arms 22.

A casing 23 of suitable material as for instance of wood properly recessed to receive the elements to be later mentioned, is connected with the body 9 of the frame at the front of the receptacle, in any suitable manner, and a post 24 is arranged between the said casing and the upper face of the base 1. The lower end of the post rests upon the base and may be secured thereto in any suitable manner, and the upper end of the post is rabbeted on the front face to form a tenon 25. The casing 23 is recessed on its rear face and at the under side thereof and at approximately the center of the said casing as shown at 26, to receive the tenon 25, and the said tenon 25 may be secured in the recess in any suitable manner. It will be noted from an inspection of Fig. 1, that the under face of the casing is convex longitudinally, and the said casing is provided with a transverse opening 27, near one side, the outer end of the opening being counterbored or enlarged as shown at 28. A press button 29 is arranged at the said opening, the button fitting approximately the counterbore or recess 28, and the said button has a stem 30, which extends through the opening 27. The casing is also recessed vertically from its upper edge as indicated at 31, to receive the loop 21, before mentioned, and a spring plate 32 is provided with a laterally extending pin 33, which passes through the rear wall of the recess 31, to engage the loop, to prevent lifting of the lid or cover. The stem of the press button 29, before mentioned, is connected to one end of the plate 32, and the opposite end of the plate is offset laterally as shown at 34, and is secured to the inner face of the casing 23 by means of a screw 35, or the like. The plate is so arranged, that the pin 33, before mentioned, is normally in engagement with the loop 21, or at least in position to engage the said loop, and to extend the press button 29 beyond the face of the casing 23. When it is desired to unlock the cover, the button 29 is pressed inwardly as indicated in dotted lines in Fig. 3. The pin 33 is thus withdrawn from engagement with the loop 21, and the cover may be lifted, swinging on the hinges 20. When the cover is dropped into closed position the free end of the plate 32 is moved rearwardly to permit the body of the loop to pass the pin 33, and as soon as the body of the loop has passed the pin, the plate returns to its normal position, thus locking the cover in closed position. The free end of the pin 33 is beveled as shown more particularly in Fig. 2 for engagement by the body of the loop to move the said pin rearwardly.

The construction of the receptacle is such that the fruit may be inspected without the necessity of opening the receptacle, but the fruit cannot be handled nor can it be removed from the receptacle without releasing the lock.

The receptacle may be easily knocked down for transportation by releasing the nuts 13 and removing the bolts 4. When the nuts 13 are removed, the end and side frames of the receptacle may be detached from the base, and the said frames may be folded together in a flat package, together with the cover. The removal of the bolts 14 permits the detachment of the supporting brackets, and the said brackets may be packed together with the folded receptacle on the base.

The receptacle, without the supporting frames, may be used as a shipping receptacle if desired. The arms 10 of the end and side frames may be connected, if desired, by twisting a loop of wire around the adjacent arms near their junction with the bodies.

I claim:—

A device of the character specified, comprising a base having supporting brackets, and a receptacle connected with the base, a cover hinged to the receptacle at one side thereof, said receptacle comprising side and end frames, each of the said frames comprising a body portion and depending arms, the arms inclining inwardly toward each other toward their lower ends, and each of the said arms having at its lower end an angular portion for engaging the upper face of the base, each of the angular portions having a depending threaded lug at the end remote from the arm, the base having openings for receiving the lugs and nuts engaging the lugs below the base, said side and end frames having intersecting wires for closing said frames, said cover comprising a rectangular frame resting upon the bodies of the side and end frames of the receptacle when the cover is closed, and a frame of smaller area arranged above the first-named frame, the said cover frames being connected by intersecting wires, the supporting brackets for the base being detachably connected therewith.

ODE ROBERTS.

Witnesses:
W. O. WOODWARD,
S. S. ARLEDGE.

Copies of this patent may be obtained for five cents each, by addressing the "Commissioner of Patents Washington, D. C."